United States Patent
Crichton et al.

(10) Patent No.: US 8,977,641 B1
(45) Date of Patent: Mar. 10, 2015

(54) SUGGESTING PARTICIPATION IN AN ONLINE SOCIAL GROUP

(71) Applicant: Google Inc., Mountain View, CA (US)

(72) Inventors: Daniel M. Crichton, Eden Prairie, MN (US); Frances B. Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 98 days.

(21) Appl. No.: 13/630,768

(22) Filed: Sep. 28, 2012

Related U.S. Application Data

(60) Provisional application No. 61/541,958, filed on Sep. 30, 2011.

(51) Int. Cl.
G06F 17/30 (2006.01)
(52) U.S. Cl.
USPC .......................................................... 707/767
(58) Field of Classification Search
USPC .......................................................... 707/767
See application file for complete search history.

(56) References Cited

U.S. PATENT DOCUMENTS

| | | | |
|---|---|---|---|
| 2007/0204308 A1* | 8/2007 | Nicholas et al. | 725/86 |
| 2009/0049127 A1* | 2/2009 | Juan et al. | 709/204 |
| 2009/0150214 A1* | 6/2009 | Mohan | 705/10 |
| 2009/0164929 A1 | 6/2009 | Chen et al. | |
| 2010/0205541 A1* | 8/2010 | Rapaport et al. | 715/753 |
| 2012/0078953 A1* | 3/2012 | Araya | 707/769 |
| 2012/0131032 A1* | 5/2012 | Rakshit | 707/767 |
| 2012/0278262 A1* | 11/2012 | Morgenstern et al. | 706/12 |

* cited by examiner

*Primary Examiner* — Cam-Linh Nguyen
(74) *Attorney, Agent, or Firm* — Fish & Richardson P.C.

(57) ABSTRACT

Techniques include: receiving a first search query from a user; determining a topic associated with the first search query; sending a second search query to the user, where the second search query is associated with the topic and is different from the first search query; receiving a selection of the second search query from the user; and, when the second search query has been received from other users more than a specified number of times within a time window, sending an invitation to the user. The invitation may be for inviting participation in an online social group that includes others who have sent the second query to the server system within the time window. The invitation can be for inviting participation in an online social group including other users (e.g., members of a social network) who have sent the second query to the server system within the time window.

22 Claims, 7 Drawing Sheets

SUGGESTING PARTICIPATION IN AN ONLINE SOCIAL GROUP

CROSS-REFERENCE TO RELATED APPLICATION

Priority is hereby claimed to U.S. Provisional Application No. 61/541,958, which was filed on Sep. 30, 2011. The contents of U.S. Provisional Application No. 61/541,958 are hereby incorporated by reference into this disclosure.

BACKGROUND

This disclosure relates generally to suggesting participation in an online social group.

Social networks permit users to post information about themselves and to communicate with other people, e.g., their friends, family, and co-workers. Some social networks permit users to specify friendships with other users. Additionally, social networks may provide users with opportunities to interact with other users who are on, or outside of, the social network.

SUMMARY

An example of a technique for inviting participation in an online social group may include the following operations: receiving a first search query from a user; determining a topic associated with the first search query; sending a second search query to the user, where the second search query is associated with the topic and is different from the first search query; receiving a selection of the second search query from the user; and, when the second search query has been received from other users more than a specified number of times within a time window, sending an invitation to the user, where the invitation is for suggesting participation in an online social group that includes others who have sent the second query to the server system within the time window. The invitation can be for inviting participation in an online social group including other users (e.g., members of a social network) who have sent the second query to the server system within the time window. In some examples, the online social group can include a participatory experience in which a user who sent the second search query may interact with the others (e.g., a forum or a chat room).

In the foregoing technique, determining the topic can include performing a search of a search index using the first search query to identify the topic. The foregoing technique can also include associating the topic to the second search query, where the second search query relates to the topic but is different from the first search query.

In the foregoing technique, the first search query can include a first search term relating to the topic and the second search query can include a second search term relating to the topic, where the second search term is different from the first search term; and a beginning of the time window can be set in response to a first receipt of the second search query, where the time window extends for a predefined duration following the beginning. In some examples, a first receipt of the second search query can occur following expiration of a previous time window The foregoing technique can further include sending the second query to other users in response to third search queries received from the other users and prior to receiving the second query from the other users. At least one of the third search queries may be different from the first search query. The technique can also include storing a time that the second query is received from each of the other users; and comparing the time that the second query was received from the user to times that the second query is received from each of the other users in order to determine if the search query was received from the user within the time window.

Another example of a technique for suggesting participation in an online social group may include the following operations: receiving a first search query from a user; determining a topic associated with the first search query; associating a second query associated with the topic; and establishing an online social group for which participation is suggested in response to receipt of the second query.

In the foregoing technique, the second query can be different from, or identical to, the first query. In some implementations, determining the topic can include performing a search of a search index using the first search query to identify the topic, and the foregoing technique can further include correlating the topic to the second search query, where the second search query relates to the topic but is different from the first search query. The second query can be associated with the topic based on historical data for queries about the topic.

Advantages of the foregoing techniques may include guiding users toward social interaction with one another by providing appropriate query suggestions and invitations to online social groups.

Two or more of the features described in this disclosure, or portions thereof, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are techniques for suggesting participation in an online social group. The techniques includes receiving a first search query from a user; determining a topic associated with the first search query; and, in response, sending a second search query to the user. The second search query is associated with the topic but may be different from the first search query. The techniques may be used to suggest to a user that the user provide a search query about a topic that is the same as other search queries provided by other searchers about the topic. For example, the first search query may be "Red Sox Nation". The system may use analytical techniques to determine that the subject of the first query is the "Boston Red Sox". Accordingly, the system may then send a proposed query, e.g., "Boston Red Sox" back to a computing device associated with the user. This proposed query may then be entered, at the computing device (e.g., as part of a search request).

More specifically, the second search query is received at the computing device, and may be sent back to a server. The server may perform a search based on the second search query, and may also determine whether to connect the user to an online social group based on the second search query or to start a new online social group based on the second search query. For example, in a case that the second search query has been received from different computing devices more than a specified number of times within a time window, the system may send an invitation to the user's computing device. The invitation may invite the user to participate in an online social group that includes others who have sent the second query to the server system within the time window. So, in the example set forth above, if the system has suggested the "Boston Red Sox" query to a number (e.g., 1000) of searchers, e.g., within the past hour, and has received that query back from a number (e.g., 100) of those searchers, the system may start an online social group of searchers who are interested in the Boston Red Sox. If there is an existing group, the system may connect the user to the existing group. Searchers who submitted the second query within the past hour may be invited to join the online social group. The online social group may be, e.g., a chat room, an online forum, or other appropriate social tool.

Figure 1:
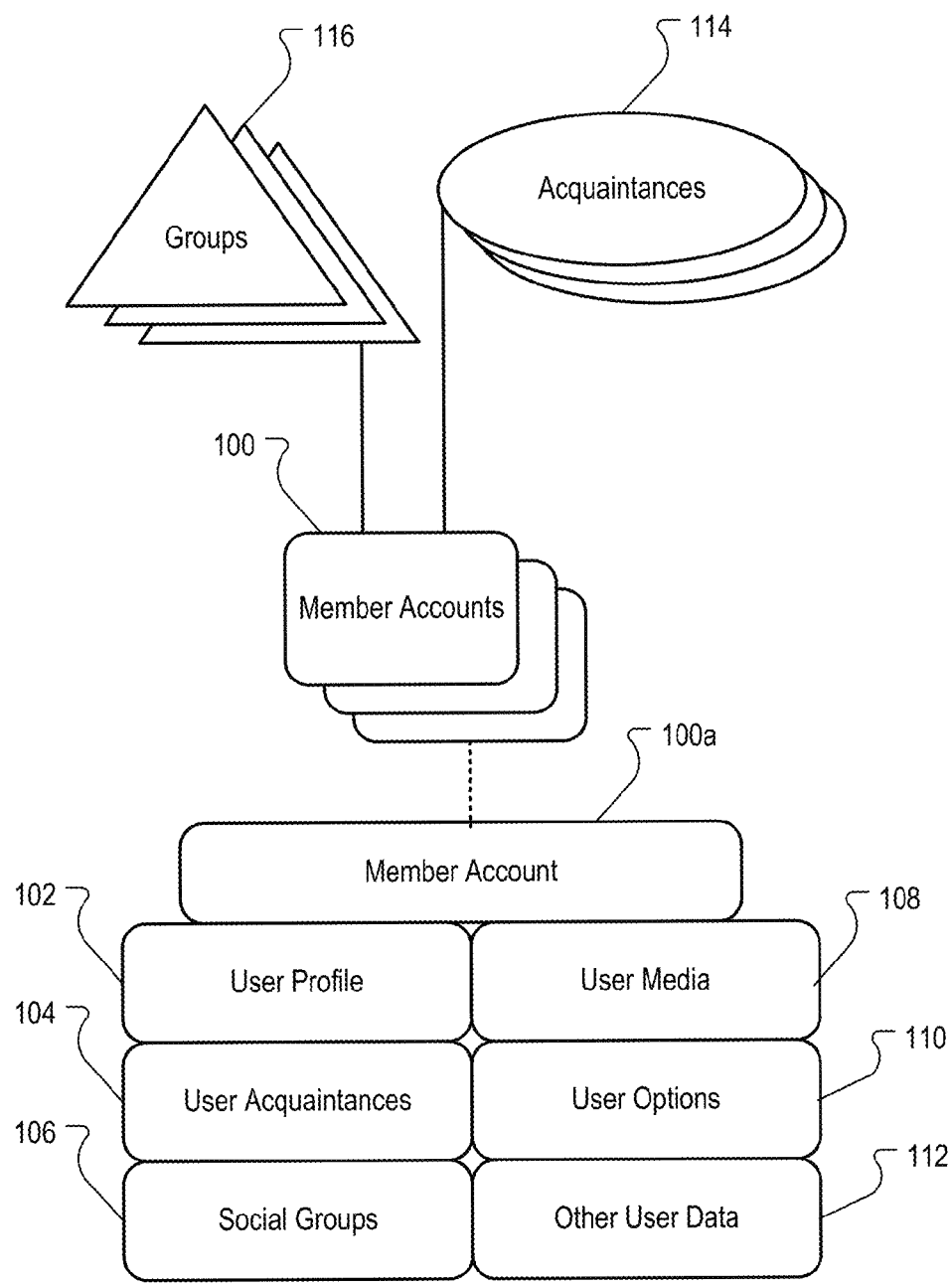
FIG. 1 is a block diagram of an example group of member accounts hosted by a social networking service.

FIG. 1 is a block diagram of an example group of member accounts 100 hosted by a social networking service. As shown, a member account 100a can, for example, include user profile data 102, user acquaintance data 104, online social group data 106, user media data 108, user options data 110, and other user data 112.

User profile data 102 can, for example, include general demographic data about the user associated with the account. User profile data 102 can also include professional information, e.g., occupation, educational background, etc., and other data, e.g., contact information. In some implementations, user profile data 102 can include open profile data, e.g., free-form text that is typed into text fields for various subjects, e.g., "Job Description," "Favorite Foods," etc., and constrained profile data, e.g., binary profile data selected by check boxes, radio buttons, etc., or predefined selectable profile data, e.g., income ranges, zip codes, etc. The user profile data 102, or portions thereof, can be classified as public or private profile data, e.g., data that can be shared publicly or data that can be selectively shared. Profile data 102 not classified as private data can, for example, be classified as public data, e.g., data that can be viewed by user accessing the social network.

User acquaintances data 104 can, for example, define user acquaintances 114 associated with member account 100a. User acquaintances 114 can include, for example, users associated with other member accounts 100 that are classified as "friends," e.g., member accounts 100 referenced in a "friends" or "buddies" list. Other acquaintances 114 can also be defined, e.g., professional acquaintances, client acquaintances, family acquaintances, etc. In an implementation, user acquaintance data 104 for member account 100a can, for example, be specified by the user associated with the member account.

The online social group data 106 can, for example, relate to online social groups 116 to which member account 100a is associated. Online social groups 116 can, for example, relate to an interest or topic, e.g., "Wine," "Boston Red Sox," "Cooking," etc. Online social groups 116 can, for example, be categorized, e.g., a first set of online social groups 116 can belong to an "Activities" category, a second set of online social groups 116 can belong to an "Alumni & Schools" category, etc. In some implementations, online social groups 116 can include members of the social network that are currently interacting. For example, an online social group 116 can include a group of social network members that are currently interacting in a video chat room. Members of an online social group may, or may not, be acquaintances.

User media data 108 can, for example, include user documents, e.g., Web pages. A document can, for example, include a file, a combination of files, one or more files with embedded links to other files, etc. The files can be, e.g., text, audio, image, video, hyper-text mark-up language documents, etc. In the context of the Internet, a common document is a Web page.

User options data 110 can, for example, include data specifying user options, e.g., e-mail settings, acquaintance notification settings, chat settings, password and security settings, etc. Other option data can also be included in user options data 110.

The other user data 112 can, for example, include other data associated with member account 100a, e.g., links to other social networks, links to other member accounts 100, online statistics, account payment information for subscription-based social networks, etc. Other data can also be included in the other user data 112.

The process described above may be implemented in an appropriate network environment, with appropriate devices and computing equipment. An example of such an environment is described below.

Figure 2:
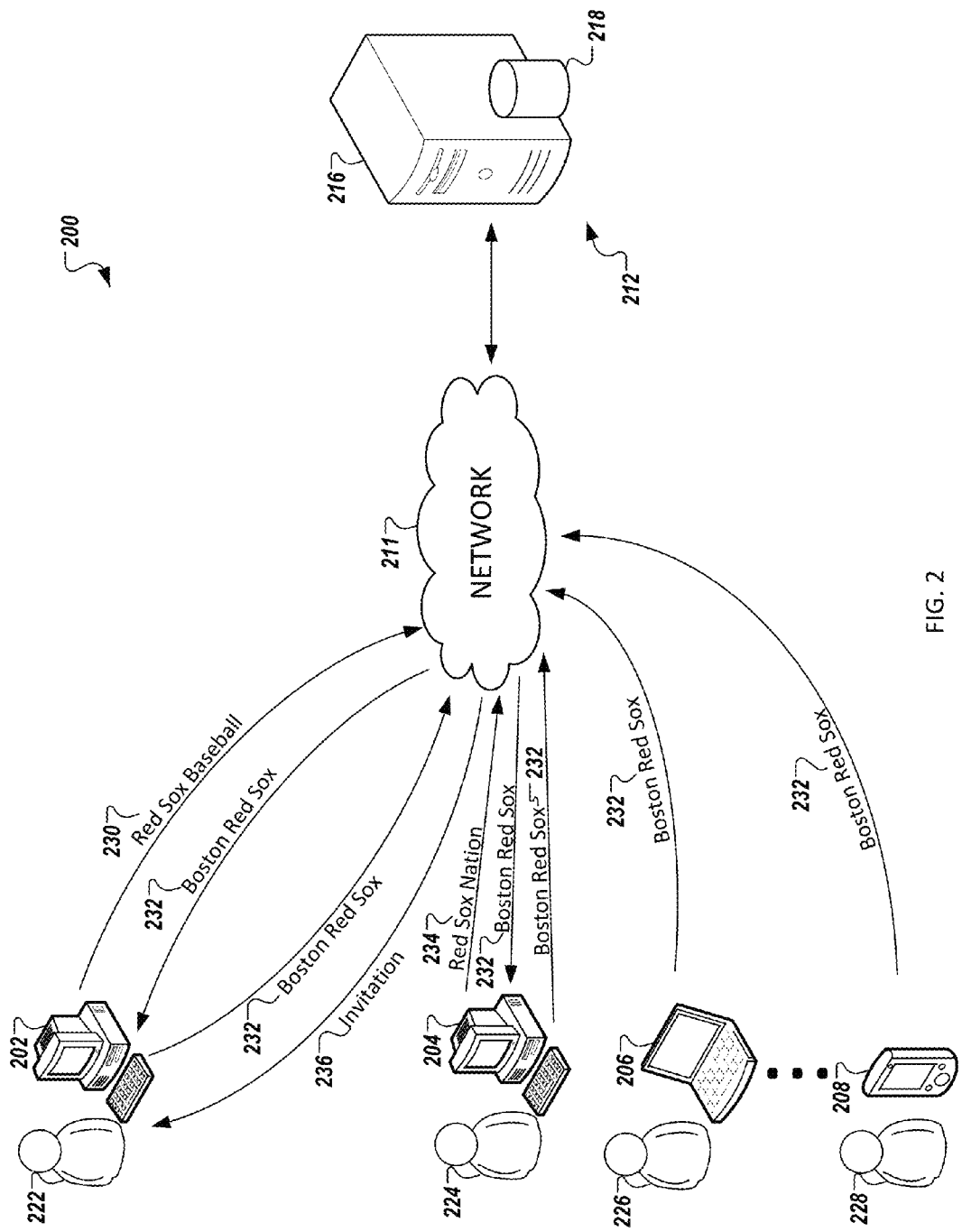
FIG. 2 is a block diagram showing an example network environment on which a process for suggesting participation in an online social group may be implemented.

FIG. 2 is a block diagram showing an example network environment 200 on which the process described herein for suggesting participation in an online social group may be implemented. Network environment 200 can include computing devices 202, 204, 206, 208 that can each communicate with a server system 212 over a network 211. Each of computing devices 202, 204, 206, 208, when in use, has a respective user 222, 224, 226, 228 associated therewith. The server system 212 one or more computing devices 216 and a machine-readable repository, or database 218 located in one or more locations. Example environment 200 may include many thousands of Web sites, computing devices and servers, which are not shown.

The network 211 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 202 to 208 enable respective users 222 to 228 to access and to view documents, e.g., Web pages included in Web sites. Users 222 to 228 can be members of a social networking service. For example, user 222 of computing device 202 can view a Web page using a Web browser. The Web page can be provided to computing device(s) 202 to 208 by server system 212 or another server system (not shown). In example environment 200, computing devices 202 and 204 are illustrated as desktop-type computing devices, computing device 206 is illustrated as a laptop-type computing device, and computing device 208 is illustrated as a mobile computing device. It is appreciated, however, that computing devices 202 to 208 can each be any type of computing device, examples of which include a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

As noted above, network environment 200 can be used to implement a process for suggesting participation in an online social group. For example, as shown, user 222 at computing device 202 can submit a first search query 230 ("Red Sox Baseball") to server system 212. Server system 212 can receive first search query 230 and determine a topic associated with the first search query. Server system 212 may then send a second search query 232 ("Boston Red Sox") to computing device 202 as part of a message or control to be displayed. Second search query 232 may be associated with the same topic as first query 230 (e.g., the "Boston Red Sox"). In some examples, second search query 232 can be different from first search query 230.

Second search query 232 can be presented as a suggested query. In some examples, second search query 232 can be determined so as to guide user 222 into interaction with others (e.g., users 224 to 228). For example, second search query 232 can be similar or identical to queries that are currently being received (or have recently been received) from other users (as described below). Accordingly, users receiving and accepting suggested queries can be led to initiate similar searches (e.g., searches with the same search query relating to the same topic) as other users. Users initiating an identical search may be considered by server system 112 as likely to interact with one another.

Server system 212 can receive second search query 232 from computing device 202. For example, second search query 232 may be submitted to server system 212 as part of a search request initiated by user 222. As illustrated in FIG. 2, in some cases, second search query 232 may also be received by server system 212, from other computing devices (e.g., computing devices 204 to 208).

As shown, second search query 232 can also be submitted by the computing devices in response to a query suggestion or as an initial query. For example, server system 212 can receive a third search query 234 from computer device 204 and provide second search query 232 as a query suggestion in response (as described above). In this way, various different types of initial search queries can result in a similar or identical final search query.

The number of times a particular search query is received by server system 212 within a specified time (e.g., an hour, two hours, a day, a week, etc.) can be referred to as its "traffic volume". If the traffic volume associated with second search query 232 is greater than a prescribed threshold (e.g., 10, 100, 1000 queries per hour), server system 212 may send an invitation 236 to computing device 202. Invitation 236 may include a selectable option for participation in an online social group related to the topic associated with first and second queries 230, 232. The online social group can include other users 224, 226, 228 who have submitted second search query 232 to server system 212.

Figure 3:
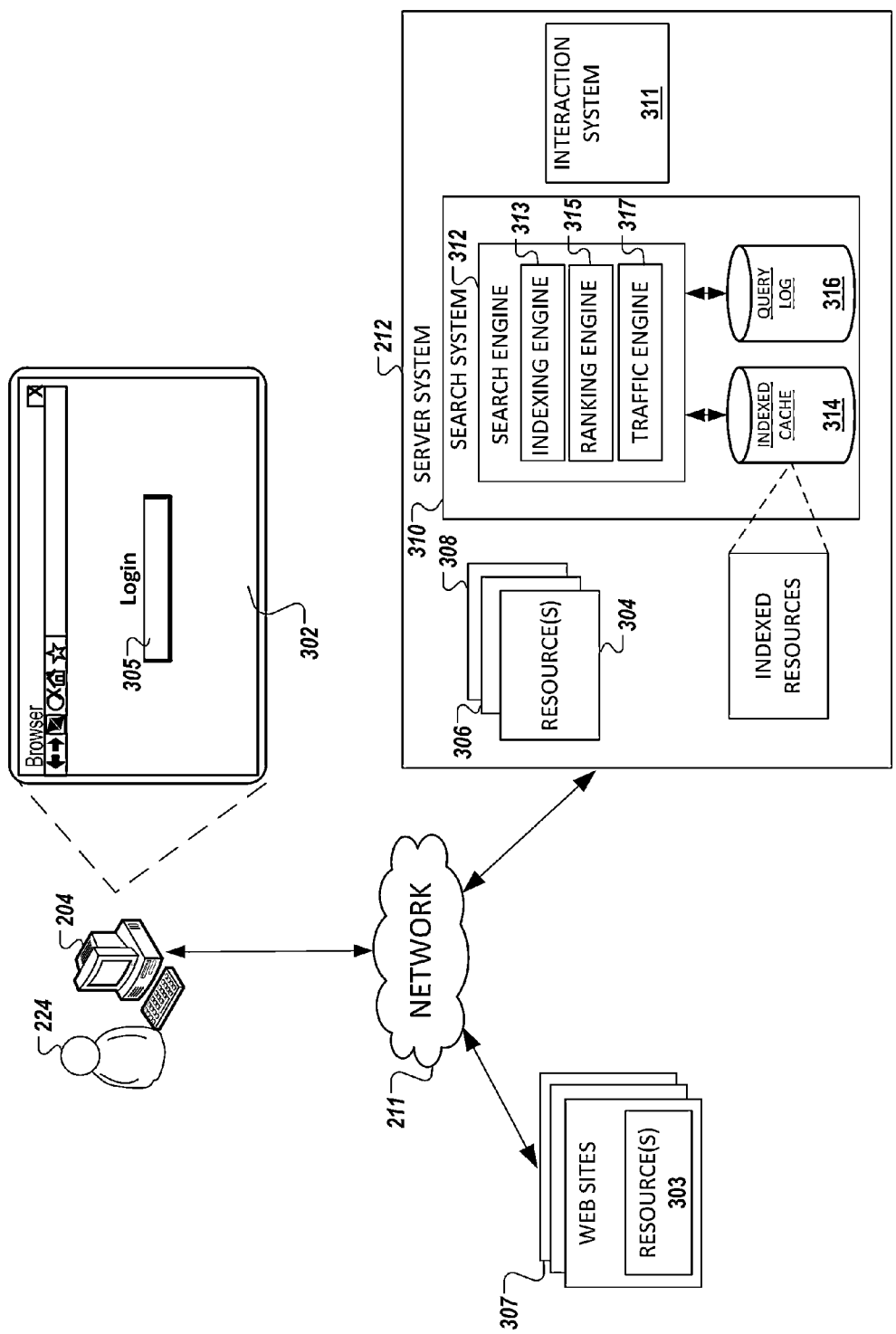
FIG. 3 is a diagram of an example portion of the network environment of FIG. 2 that includes a server system.

FIG. 3 is a diagram of an example portion of the network environment of FIG. 2 that includes server system 212. Server system 212 can include a search system 310 that identifies resources 303 (e.g., Web pages, images, or news articles on the Internet, as well as member accounts hosted by the social networking service) by crawling and indexing resources, e.g., resources provided by content publishers on Web sites 307.

Server system 212 can also include a user interaction system 311 that facilitates online interactions between users 222, 224, 226, 228. For example, user interaction system 311 can manage real-time chat communications (e.g., instant messaging and/or audio/video conferencing) between two or more users by generating and maintaining online chat rooms (e.g., text or video chat rooms). In some implementations, with user permission, user interaction system 311 can also monitor the presence/availability status of users. For example, user interaction system 311 can determine, among other things, whether users are offline (e.g., not logged-in to the social networking service), currently in a chat room, and/or currently available or unavailable for chatting.

Computing device 204 can communicate with server system 212 and display a Web page 302 provided by server system 212 for accessing a social networking service. In this example, server system 212 stores a plurality of resources 304, 306, 308, each having an associated resource identifier ("Resource ID"). In this example, resources 304, 306, 308 correspond to different content available from the social networking service. Owners of private content stored on server system 212 may grant permission to have their private content made available to others, e.g., by selecting an option on their user profile.

To view a Web page, user 224 can input or select a Resource ID using a browser that is executing on computing device 204. The Resource ID can include, for example, a uniform resource indicator (URI) or a uniform resource locator (URL). A request including the Resource ID is transmitted from computing device 204 to server system 212 over network 211. In response, the server system identifies the requested resource based on the Resource ID, and transmits the resource to computing device 204 over network 211. For example, the resource may be a Web page 302, through which a user may access a social networking service. The Web page may include a field 305 for inputting member account information, e.g., a username and/or password.

The social networking service may include a search system 310 that identifies resources by crawling and indexing those resources. In this regard, search system 310 may include a search engine 312. Search engine 312 can include an indexing engine 313, a ranking engine 315, and a traffic engine 317. Indexing engine 313 is configured to index resources (e.g., discussion topic by subject, discussion topics by tag, member accounts, social media posts, and the like), which may be found in the corpus of the social networking service (e.g., a collection or repository of content) or on publicly-accessible Web sites. An index cache 314 stores the index information, and ranking engine 315 (or other software) ranks the resources based on criteria, e.g., popularity. The indexed and, optionally, cached copies of the resources can be stored in an indexed cache 314.

Traffic engine 317 can analyze traffic related to submitted search queries, Web page accesses, downloads of images, video, audio, or other content, and so forth. The processes performed by traffic engine 317 can include analyzing query log 316 to identify the traffic volume of a query (and/or the historical volume of the query over a specific period of time) and determining, for a particular query, a forecasted volume based on the historical volume. The analysis can further include identifying queries that currently have a traffic volume spike above their forecasted volumes (e.g., largest positive difference between the actual traffic volume and the forecasted traffic volume). Queries that have volume spikes within a pertinent time interval can be indicative of events of interest, and can relate to other queries that have occurred during a specified time interval.

Figure 4:
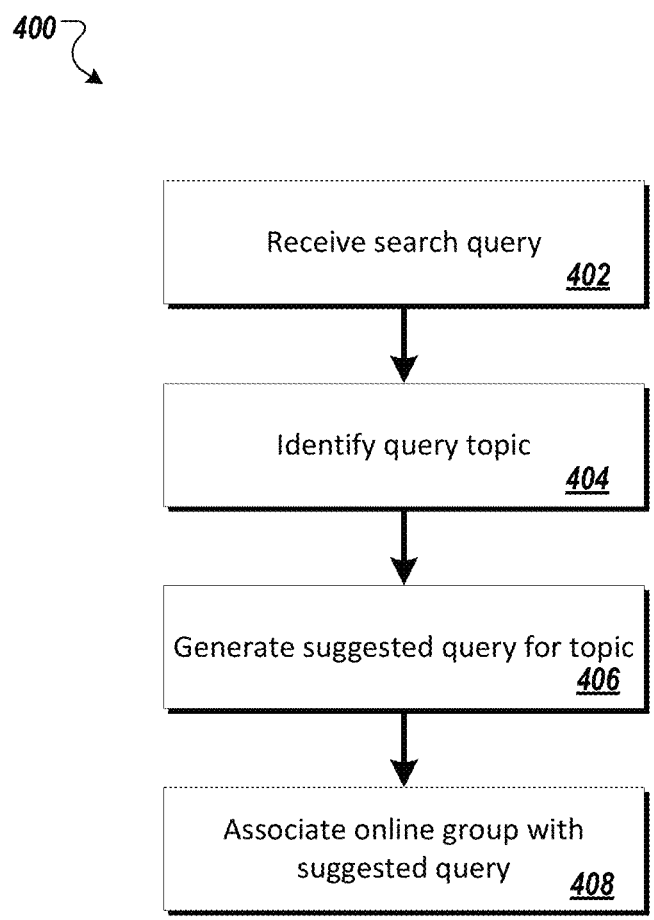
FIG. 4 is a flowchart of an example method for identifying online social groups.

FIG. 4 is a flowchart of an example method for identifying online social groups. Process 400 may be performed by a system of one or more computers in one or more locations, appropriately programmed in accordance with this specification, e.g., by server system 212.

Process 400 receives a search query (402). For example, a user can submit a search query (e.g., text, images, audio, video, or other content) to a server system 212 through a network (e.g., network 200). The search query can be informational (covering a broad topic, e.g., "Texas" or "football"), navigational (seeking a particular Web site or page, e.g., "National Airlines"), and/or transactional (reflecting the intent of the user to perform a particular action, e.g., "dinner reservations"). The user can enter the search query, e.g., using input components of a computing device, in a search field of a Web page displayed on the user's computing device. The user can provide an instruction to implement a search based on the query, for example by selecting a search option on the Web page. In response to the instruction, the computing device outputs the search query to a search engine. The search engine described herein is part of, or capable of searching, a social networking service. However, search engines outside the context of a social networking service may be used. In some examples, the search query is received along with a request for query suggestions (e.g., user interaction suggestions, as discussed in detail below).

Process 400 identifies a query topic (404). For example, server system can perform a search on an index using the received search query to identify a query topic. For instance, consider the informational search query "Yankees." Matches in the search index may include content associated with the following topical tags: "sports", "business", and "New York". As such, these topics can be considered topic candidates for the search query "Yankees." Further consider that one-hundred of the matches are tagged with "sports", two-hundred with "business" and three-hundred with "New York." "New York" may be considered the most relevant topic because it is the most popular topical tag of the matches.

Other appropriate methods and routines can also be used to identify query topics. For example, the server system can identify common keywords (or images, audio or video, where appropriate) associated with matches in the index to the search query (e.g., content that is associated with at least a majority of the matches in the index can be identified as topics by the server system). The server system can also identify trending queries as query topics. For example, the server system can receive a unique search query from a user and identify a similar currently trending query as a topic associated with the unique search query. The server system can also access a query log to identify query topics.

Process 400 generates a suggested query for the topic (406). For example, the suggested query can be associated with the topic based on historical data for queries about the topic. The suggested query can be associated with the determined topic and be different from the originally received search query. Possible query suggestions can be identified by accessing a query log to determine queries that are currently trending. For instance, the server system can identify currently trending queries that are associated with the determined topic. In some examples, the server system can identify and rank a number of possible query suggestions according to an order from a rank of most relevant to a rank of least relevant. Various ranking algorithms and criteria can be used to rank the possible query suggestions. For example, possible query suggestions can be ranked based on relevance to the determined topic or based on traffic volume.

Process 400 associates an online social group with the suggested query (408). For example, the server system can identify currently existing online social groups that are about, or are producing content related to, the suggested query (e.g., chat rooms or forums discussing the determined topic or mentioning the suggested query). The server system can also establish or create new online social groups based on the suggested query. For example, the server system can invite users who are likely to be interested in the determined topic or the suggested query to participate in a newly established online social group.

Figure 5:
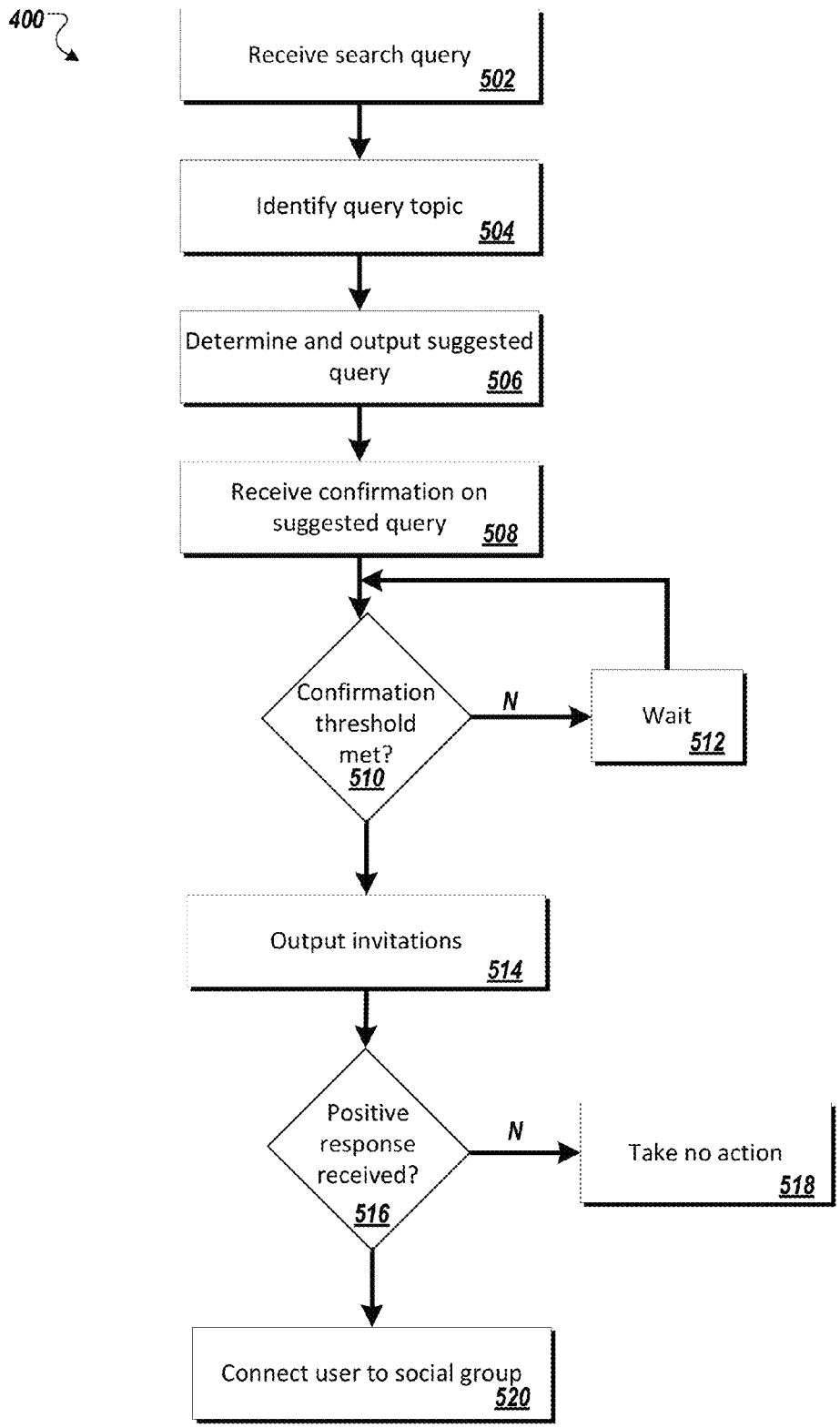
FIG. 5 is a flowchart of an example method for suggesting participation in an online social group.

FIG. 5 is a flowchart of an example method for suggesting participation in an online social group. Process 500 may be performed by a system of one or more computers in one or more locations, appropriately programmed in accordance with this specification, e.g., by server system 212.

Process 500 receives a search query (502), e.g., from a user operated computing device, and identifies a topic associated with the received search query (504). The topic may be identified, e.g., in accordance with the process of FIG. 4. Process 500 determines a suggested query based on the identified topic and outputs the suggested query (506) to the computing device. Process 500 receives the suggested query (508). For example, a user operating the computing device can confirm or accept the suggested query and initiate a search by submitting the suggested query to the server system with a search request.

Process 500 determines the number of times the suggested query has been received within a specified time window (510). For example, the process can determine how many search requests including the suggested query have been received within the time window by accessing a query log. As discussed above, the server system can receive queries from a number of distinct computing devices. In some examples, the server system can generate and store a time stamp associated with each receipt of the suggested query from each of the computing devices. Accordingly, the server system can compare the time that the second query was received from the user operated computing device to the time that the second query was received from the other computing devices in order to determine if the search query was received from the computing device within the time window. The beginning of the time window can be set by the server system in response to a first receipt of the second search query, and can extend for a predetermined duration (e.g., one minute, five, minutes, thirty minutes, and/or one hour) following the established beginning.

If the number of second query receipts within the time window is less than a threshold, process 500 can wait (512) to receive additional suggested query confirmations. If the number of second query receipts within the time window is greater than the threshold, process 500 can output invitations to join an online social group associated with the determined topic (514).

Process 500 can determined if an invitation to join the online social group has been accepted (516). If the invitation has been accepted, process 500 can connect the user to the online social group (518). For example, the server system can connect the user to a video chat room by granting a computing device associated with the user access to a particular server hosting the video chat room. The server system can also provide, to the user associated computer device, a web address for the video chat room server. Other conventional methods for connecting users to online social groups (e.g. a chat room, an online forum, or other appropriate social tool) can also be used. If the invitation is not accepted, process 500 can take no action (520).

Figure 6A:
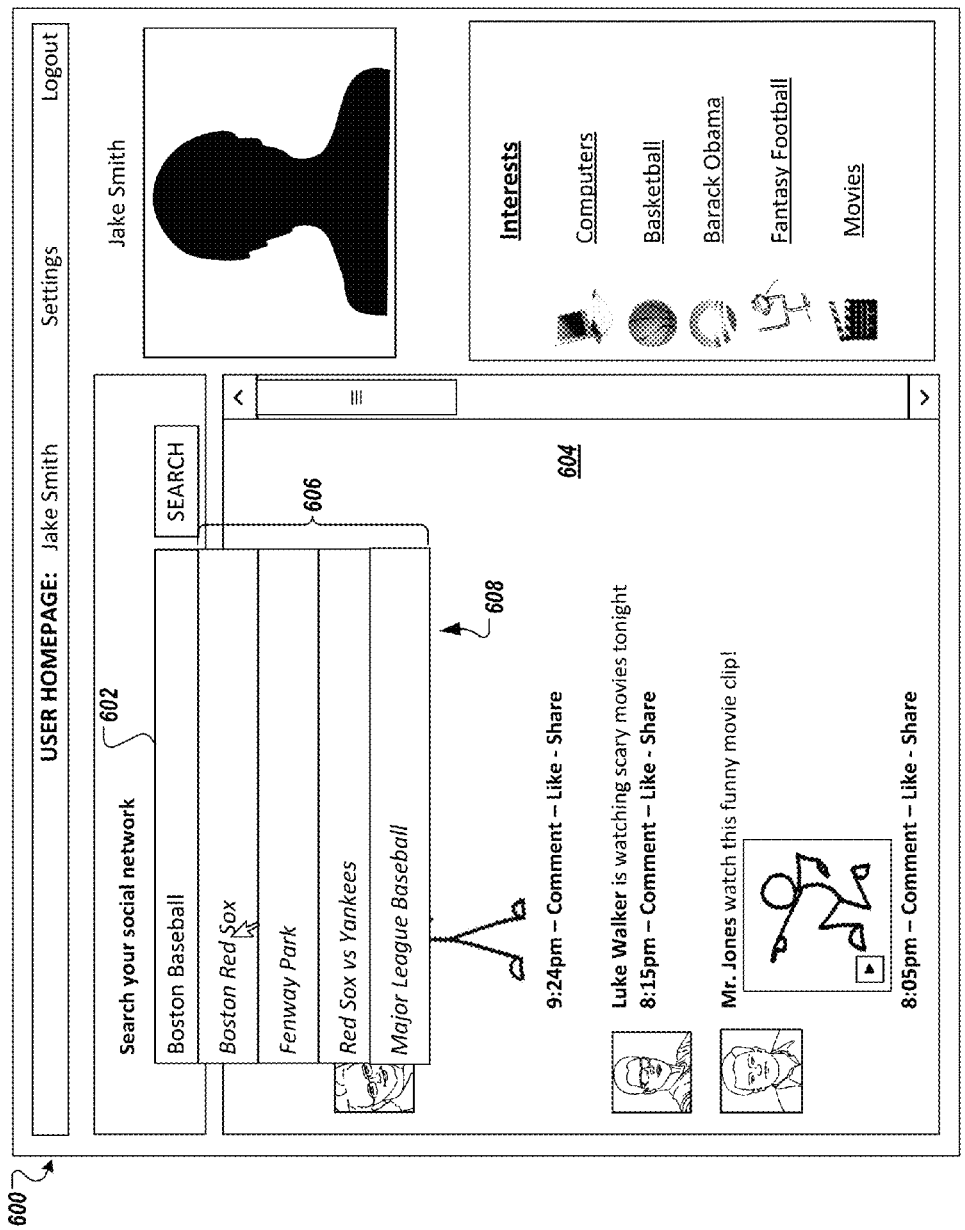
FIGS. 6A and 6B illustrate an example Web page that can be displayed on a client device associated with a user.
Figure 6B:
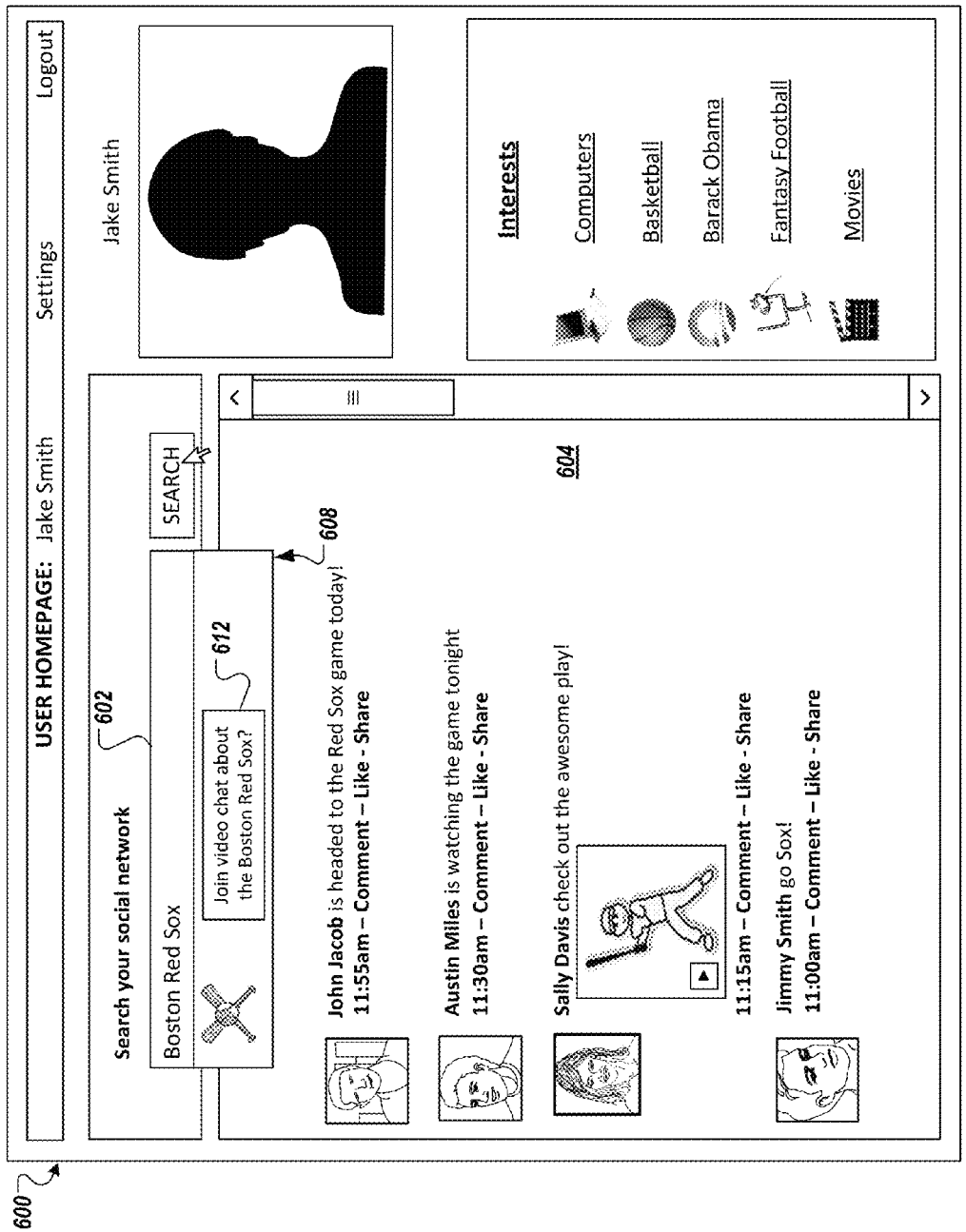

FIGS. 6A-6B illustrate an example Web page 600 that can be displayed on a client device associated with a user. For example, Web page 600 can be a homepage for a user accessing a social networking service. As shown, Web page 600 includes a query input field 602 that can receive queries from a user, as well as a content stream 604. Content stream 604 may include an appropriate content, e.g., text, video, images, and links available in the corpus. In this example, content stream 604 includes social media posts that have been retrieved and rendered based on the query entered in query input field 602. The content stream may be updated, either automatically or in response to user input, e.g., a refresh or a search.

As shown in FIG. 6A, a query (e.g., a single word, a portion of a word, a string or words, an image, video, audio, etc.) entered in query input field 602 can be provided to server system 212 with a request for query suggestions, a "suggestion request". In response to the suggestion request, server system 212 can identify a topic associated with the query and a number of query suggestions (for example, by implementing process 400). The user associated client device can receive query suggestions 606 from server system 212, and present the query suggestions in a suggestion box 608 according to a ranking order from a highest ranking to a lowest ranking.

If the user confirms a query suggestion (e.g., by selecting one of the query suggestions and initiating a search), server system 212 can provide an invitation 612 to an online social group (see FIG. 6B). As described above, the online social group can be associated with a topic related to the query suggestion confirmed by the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

The processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Other implementations not specifically described herein are also within the scope of the following claims.

What is claimed is:

1. A method performed by a server system, comprising:
   receiving a first search query from a user;
   determining a topic associated with the first search query;
   determining a second search query as a suggested query to guide the user into interaction with other users who have submitted similar search queries, the second search query being associated with the topic and being different from the first search query;
   sending the second search query to the user;
   receiving a selection of the second search query from the user;
   determining a second query traffic volume, the second query traffic volume indicating a number of times the second search query has been received from other users within a time window;
   determining that the second query traffic volume is greater than a predetermined threshold traffic volume, the threshold traffic volume being indicative of a level of interest in the topic; and
   in response to determining that the second query traffic volume is greater than the threshold traffic volume, sending an invitation to the user, the invitation for inviting participation in an online social group comprised of other users who have sent the second query to the server system within the time window.

2. The method of claim 1, wherein determining the topic comprises performing a search of a search index using the first search query to identify the topic; and
   wherein the method further comprises correlating the topic to the second search query, the second search query relating to the topic but being different from the first search query.

3. The method of claim 1, wherein the first search query comprises a first search term relating to the topic, and wherein the second search query comprises a second search term relating to the topic, the second search term being different from the first search term.

4. The method of claim 1, wherein the online social group comprises a participatory experience in which a user who sent the second search query may interact with the others.

5. The method of claim 4, wherein the online social experience comprises at least one of a forum and a chatroom.

6. The method of claim 1, further comprising:
   sending the second query to other users in response to third search queries received from the other users, and prior to receiving the second query from the other users, at least one of the third search queries being different from the first search query.

7. The method of claim 6, further comprising:
   storing a time that the second query is received from each of the other users; and
   comparing the time that the second query was received from the user to times that the second query is received from each of the other users in order to determine if the search query was received from the user within the time window.

8. The method of claim 7, wherein a beginning of the time window is set in response to a first receipt of the second search query, the time window extending for a predefined duration following the beginning.

9. The method of claim 8, wherein the first receipt of the second search query occurs following expiration of a previous time window.

10. A system comprising:
    a data processing apparatus; and
    a computer storage medium encoded with a computer program, the program comprising instructions that when executed by the data processing apparatus cause the data processing apparatus to perform operations comprising:
    receiving a first search query from a user;
    determining a topic associated with the first search query;
    determining a second search query as a suggested query to guide the user into interaction with other users who have submitted similar search queries, the second search query being associated with the topic and being different from the first search query;
    sending the second search query to the user, the second search query being associated with the topic and being different from the first search query;
    receiving a selection of the second search query from the user;
    determining a second query traffic volume, the second query traffic volume indicating a number of times the second search query has been received from other users within a time window;
    determining that the second query traffic volume is greater than a predetermined threshold traffic volume, the threshold traffic volume being indicative of a level of interest in the topic; and
    in response to determining that the second query traffic volume is greater than the threshold traffic volume, sending an invitation to the user, the invitation for inviting participation in an online social group comprised of others other users who have sent the second query to the server system within the time window.

11. One or more non-transitory machine-readable media comprising instructions that are executable to perform operations comprising;
    receiving a first search query from a user;
    determining a topic associated with the first search query;
    determining a second search query as a suggested query to guide the user into interaction with other users who have submitted similar search queries, the second search query being associated with the topic and being different from the first search query;
sending the second search query to the user;
receiving a selection of the second search query from the user;
determining a second query traffic volume, the second query traffic volume indicating a number of times the second search query has been received from other users within a time window;
determining that the second query traffic volume is greater than a predetermined threshold traffic volume, the threshold traffic volume being indicative of a level of interest in the topic; and
in response to determining that the second query traffic volume is greater than the threshold traffic volume, sending an invitation to the user, the invitation for inviting participation in an online social group comprised of other users who have sent the second query to the server system within the time window.

12. A method performed by a server system, comprising:
receiving a first search query from a user;
determining a topic associated with the first search query;
associating a second search query with the topic, wherein the second query is a suggested query to guide the user into interaction with other users who have submitted similar search queries, the second search query being different from the first search query; and
establishing an online social group for which participation is suggested in response to:
receiving the second query;
determining a second query traffic volume, the second query traffic volume indicating a number of times the second search query has been received from other users within a time window; and
determining that the second query traffic volume is greater than a predetermined threshold traffic volume, the threshold traffic volume being indicative of a level of interest in the topic.

13. The method of claim 12, wherein the second query is different from the first query.

14. The method of claim 12, wherein the second query is identical to the first query.

15. The method of claim 12, wherein determining the topic comprises performing a search of a search index using the first search query to identify the topic; and
wherein the method further comprises correlating the topic to the second search query, the second search query relating to the topic but being different from the first search query.

16. The method of claim 15, wherein the second query is associated with the topic based on historical data for queries about the topic.

17. A system comprising:
a data processing apparatus; and
a computer storage medium encoded with a computer program, the program comprising instructions that when executed by the data processing apparatus cause the data processing apparatus to perform operations comprising:
receiving a first search query from a user;
determining a topic associated with the first search query;
associating a second search query with the topic, wherein the second query is a suggested query to guide the user into interaction with other users who have submitted similar search queries, the second search query being different from the first search query; and
establishing an online social group for which participation is suggested in response to:
receiving the second query;
determining a second query traffic volume, the second query traffic volume indicating a number of times the second search query has been received from other users within a time window; and
determining that the second query traffic volume is greater than a predetermined threshold traffic volume, the threshold traffic volume being indicative of a level of interest in the topic.

18. One or more non-transitory machine-readable media comprising instructions that are executable to perform operations comprising;
receiving a first search query from a user;
determining a topic associated with the first search query;
associating a second search query with the topic, wherein the second query is a suggested query to guide the user into interaction with other users who have submitted similar search queries, the second search query being different from the first search query; and
establishing an online social group for which participation is suggested in response to:
receiving the second query;
determining a second query traffic volume, the second query traffic volume indicating a number of times the second search query has been received from other users within a time window; and
determining that the second query traffic volume is greater than a predetermined threshold traffic volume, the threshold traffic volume being indicative of a level of interest in the topic.

19. The system of claim 10, wherein the online social group comprises a participatory experience in which a user who sent the second search query may interact with the others, the participatory experience comprising at least one of a forum and a chatroom.

20. The machine-readable media of claim 11, wherein the online social group comprises a participatory experience in which a user who sent the second search query may interact with the others, the participatory experience comprising at least one of a forum and a chatroom.

21. The system of claim 10, wherein determining the topic comprises performing a search of a search index using the first search query to identify the topic; and
wherein the operations further comprise correlating the topic to the second search query, the second search query relating to the topic but being different from the first search query.

22. The machine-readable media of claim 11, wherein determining the topic comprises performing a search of a search index using the first search query to identify the topic; and
wherein the operations further comprise correlating the topic to the second search query, the second search query relating to the topic but being different from the first search query.

* * * * *